United States Patent
Liu

(10) Patent No.: US 10,268,752 B2
(45) Date of Patent: Apr. 23, 2019

(54) AUTOMATIC TAXONOMY MAPPING USING SEQUENCE SEMANTIC EMBEDDING

(71) Applicant: eBay Inc., San Jose, CA (US)

(72) Inventor: Mingkuan Liu, San Jose, CA (US)

(73) Assignee: eBay Inc., San Jose, CA (US)

(*) Notice: Subject to any disclaimer, the term of this patent is extended or adjusted under 35 U.S.C. 154(b) by 281 days.

(21) Appl. No.: 15/255,815

(22) Filed: Sep. 2, 2016

(65) Prior Publication Data
US 2017/0177703 A1 Jun. 22, 2017

Related U.S. Application Data

(60) Provisional application No. 62/270,489, filed on Dec. 21, 2015.

(51) Int. Cl.
*G06F 17/30* (2006.01)

(52) U.S. Cl.
CPC .... *G06F 17/30598* (2013.01); *G06F 17/3089* (2013.01); *G06F 17/30324* (2013.01); *G06F 17/30327* (2013.01); *G06F 17/30589* (2013.01)

(58) Field of Classification Search
CPC combination set(s) only.
See application file for complete search history.

(56) References Cited

U.S. PATENT DOCUMENTS

| | | | |
|---|---|---|---|
| 2005/0216516 A1 | 9/2005 | Calistri-Yeh et al. | |
| 2009/0024623 A1* | 1/2009 | Broder | G06F 17/30864 |
| 2013/0091138 A1 | 4/2013 | Liensberger et al. | |
| 2015/0142807 A1* | 5/2015 | Hofmann | G06F 17/30424 |
| | | | 707/737 |
| 2015/0310497 A1 | 10/2015 | Valin et al. | |
| 2015/0363688 A1 | 12/2015 | Gao et al. | |
| 2016/0179945 A1* | 6/2016 | Lastra Diaz | G06F 17/30734 |
| | | | 707/739 |

FOREIGN PATENT DOCUMENTS

WO  WO-2017112482 A1  6/2017

OTHER PUBLICATIONS

"International Application Serial No. PCT/US2016/066555, International Search Report dated Mar. 27, 2017", 2 pgs.
"International Application Serial No. PCT/US2016/066555, Written Opinion dated Mar. 27, 2017", 5 pgs.

* cited by examiner

*Primary Examiner* — Shyue Jiunn Hwa
(74) *Attorney, Agent, or Firm* — Shook, Hardy & Bacon, L.L.P.

(57) ABSTRACT

In accordance with an example embodiment, an automated taxonomy mapping system that uses sequence semantic embedding techniques is described. Sequence sematic embedding models are used to generate the sequence vectors. The sequence semantic embedding models are trained offline and can be shared across different systems having different taxonomies and various versions of a category taxonomy.

20 Claims, 8 Drawing Sheets

AUTOMATIC TAXONOMY MAPPING USING SEQUENCE SEMANTIC EMBEDDING

PRIORITY

This application is a Non-Provisional of and claims the benefit of priority under 35 U.S.C. § 119(e) from U.S. Provisional Application Ser. No. 62/270,489, entitled "AUTOMATIC INVENTORY TAXONOMY MAPPING BASED ON SEQUENCE SEMANTIC EMBEDDING," filed on Dec. 21, 2015 which is hereby incorporated by reference herein in its entirety.

TECHNICAL FIELD

Embodiments of the present disclosure relate generally to the technical field of special-purpose machines that facilitate neural network processing and to the technologies by which such special-purpose machines become improved compared to other special-purpose machines that facilitate neural network processing. Specifically, the present disclosure addresses systems and methods to automatically map taxonomies based on sequence semantic embedding.

BACKGROUND

A major role of a publication site is to provide a bridge for content recipients and content generators so that content recipients can efficiently locate content or items that have been listed by content generators. The proper categorization of the content listed is important in helping the publication site provide recommendations in response to a user's query. When a content generator uploads an inventory of content to be listed on a publication site, the content titles and content categories provided by the content generators are used by the publication site to map those listings to its own taxonomy or category tree such that the publication site can make relevant recommendations in response to a user's query.

The granularity and the different terms used by parties to describe the same items creates numerous disparities between taxonomies created by different parties. Furthermore, parties are constantly updating their taxonomies, such that a prior mapping may become quickly out-of-date. It is often challenging for a publication company to continue mapping accurately with so many updates, especially using existing methods with human manual involvement, and especially when a goal of a publication company is to continue engaging with large amounts of content generators to onboard their content as listings on the publication site. For example, an existing method to address this mapping task is primarily based on lexical level matching with manually crafted mapping files and large numbers of regular expression based mapping rules. Such an approach cannot be shared across different content generators due to variations in terminology used in the taxonomies of the content generators. Furthermore, as new content is introduced, the legacy rules may no longer be relevant and may downgrade the performance of the mapping process.

BRIEF DESCRIPTION OF THE DRAWINGS

Various ones of the appended drawings merely illustrate example embodiments of the present disclosure and cannot be considered as limiting its scope.

Figure 1:
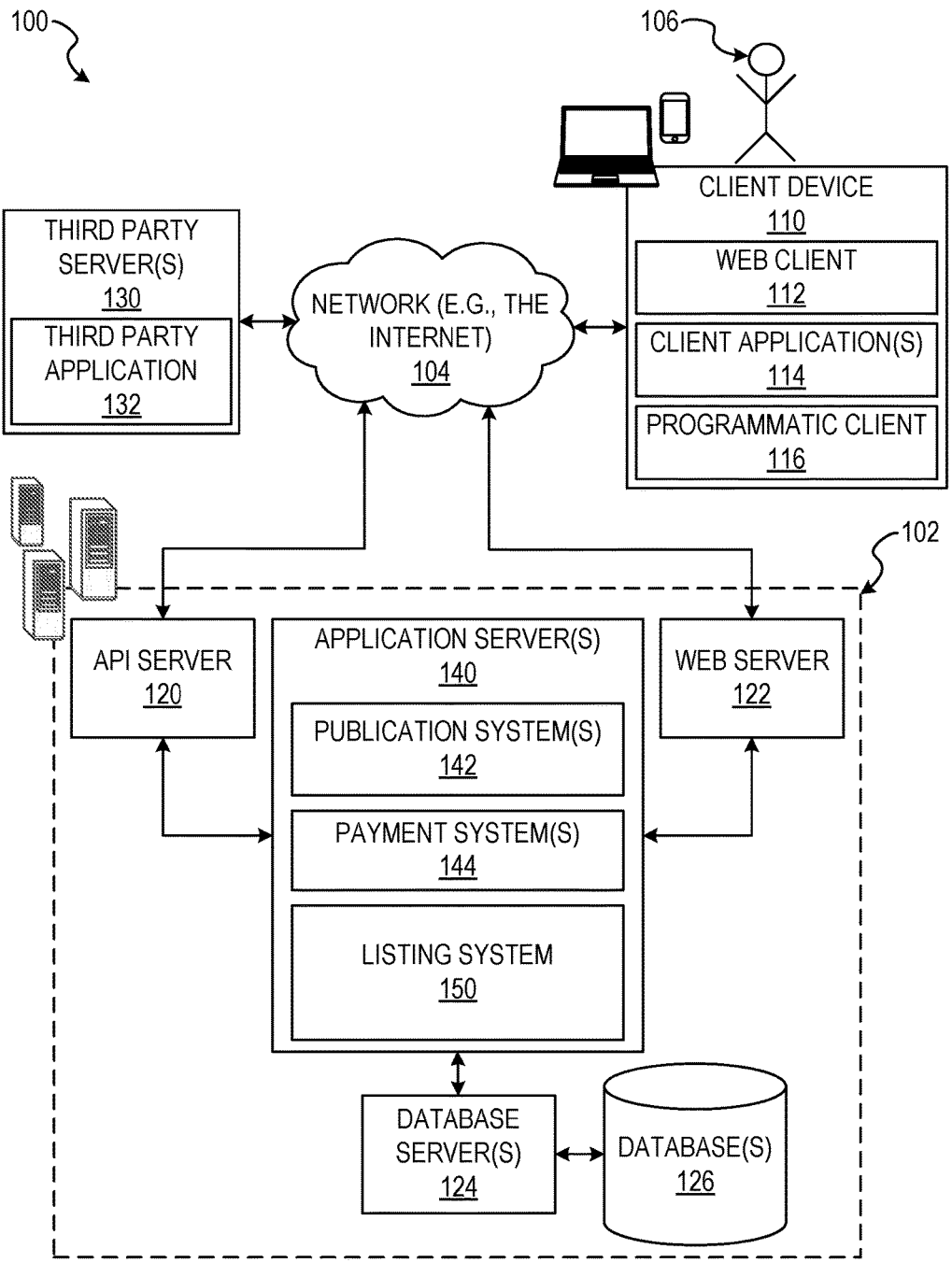
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Deep learning has recently shown much promise in Natural Language Processing (NLP). Research in this area has led to an adoption of distributed vector space representations of sentences instead of just words. In various embodiments, research in sentence embedding is leveraged to onboard a seller's inventory list onto a publication site. During the process of onboarding the seller's inventory list onto the publication site, the seller's category for each entry is mapped to the category tree used by the publication system for the publication site.

In various embodiments, sequence semantic embedding automates the capture of deep semantic meaning of a given inventory taxonomy entry and projects it into a shared semantic vector space. Thus, any given taxonomy entry from different systems can be computed and compared directly in the space. For example, a taxonomy entry included in a seller's inventory list can be compared to a taxonomy entry using a category tree in a publication system (e.g., publication site).

Sequence semantic embedding, as described in various embodiments, is used to compare different taxonomies in an automated process, thereby eliminating the manual mapping of inventories, which is slow, expensive, and not scalable when engaging a large number of business to company sellers. This sequence semantic embedding approach enables capturing contextual information and deep semantic meaning and is capable of handling large discrepancies in words such as synonyms, typos, compound words, split word, and the like.

Sequence semantic embedding (SSE) uses sequence semantic computing, which projects a sequence of symbols into a shared semantic vector space. A sequence of symbols (like a phrase, a sentence or a paragraph) is encoded into a continuous, low-dimensional vector space where semantic level similar sequences will have closer representation in this vector space. By projecting the sequence of symbols into a shared semantic vector space, different types of sequence semantics can be compared and computed. Thus, the task of seller inventory mapping while uploading a seller's inventory list into a publication system (e.g., publication site) represents a task of computing and finding the closest sequence semantic vector representations between a source taxonomy entry and a target taxonomy entry.

SSE models are used to generate the sequence vectors. In various embodiments, the SSE models are trained offline and can be shared across different systems and also various versions of a category taxonomy. For example, a publication site may update its category tree periodically and sellers (e.g., B2C sellers) may also update their category taxonomy periodically as well. Thus, as the category taxonomies of various parties evolve and get updated, the SSE models may be used to provide an automatic, fast, scalable, and convenient publication inventory taxonomy mapping systems and methods.

The training data for the SSE models may represent labeled training data that is automatically derived. In various embodiments, the SSE models are trained using already onboarded item listings in the publication system. The already onboarded existing item listings enable the SSE models to be quickly trained with relevant data. The methods used to derive the labeled training data and the SSE model training process are described in further detail below in conjunction with FIG. 5.

With reference to FIG. 1, an example embodiment of a high-level client-server-based network architecture 100 is shown. A networked system 102, in the example forms of a network-based publication or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

The client device 110 may comprise, but are not limited to, mobile phone, desktop computers, laptops, personal digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 may include one or more applications (also referred to as "apps") such as, but not limited to, a web browser, messaging application, electronic mail (email) application, a publication site application (also referred to as a marketplace application), and the like. In some embodiments, if the publication site application is included in a given one of the client devices 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely if the publication site application is not included in the client device 110, the client device 110 may use its web browser to access the publication site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information, in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

A listing system 150 provides functionality operable to perform various aspects of listing items for sale using the user selected data. For example, the listing system 150 may access the user selected data from the databases 126, the third party servers 130, the publication system 142, and other sources. In some example embodiments, the listing system 150 analyzes the user data to perform personalization of user preferences. As more content is added to a category by the user, the listing system 150 can further refine the personalization. In some example embodiments, the listing system 150 communicates with the publication systems 142 (e.g., accessing item listings) and payment system 144. In an alternative embodiment, the listing system 150 is a part of the publication system 142.

In various embodiments the listing system 150 performs the onboarding process of a seller's inventory list based on the seller's taxonomy. The seller's inventory list of items includes an item title and category (based on the seller's taxonomy) for each entry. The onboarding process is an automated process that maps the seller's taxonomy to the taxonomy of the publication system 142 or other system that provides item listings for the seller from the seller's inventory list. In an example embodiment, the listing system 150 performs the mapping of the two taxonomies using sequence semantic embedding. The automated mapping of two category taxonomies is effective even as the different category taxonomies are updated and eliminates the need for human manual involvement using lexical level matching with manually crafted mapping files and lots of regular expression based mapping rules. Additionally, this automated mapping using sequence semantic embedding can be shared across different sellers.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and listing system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
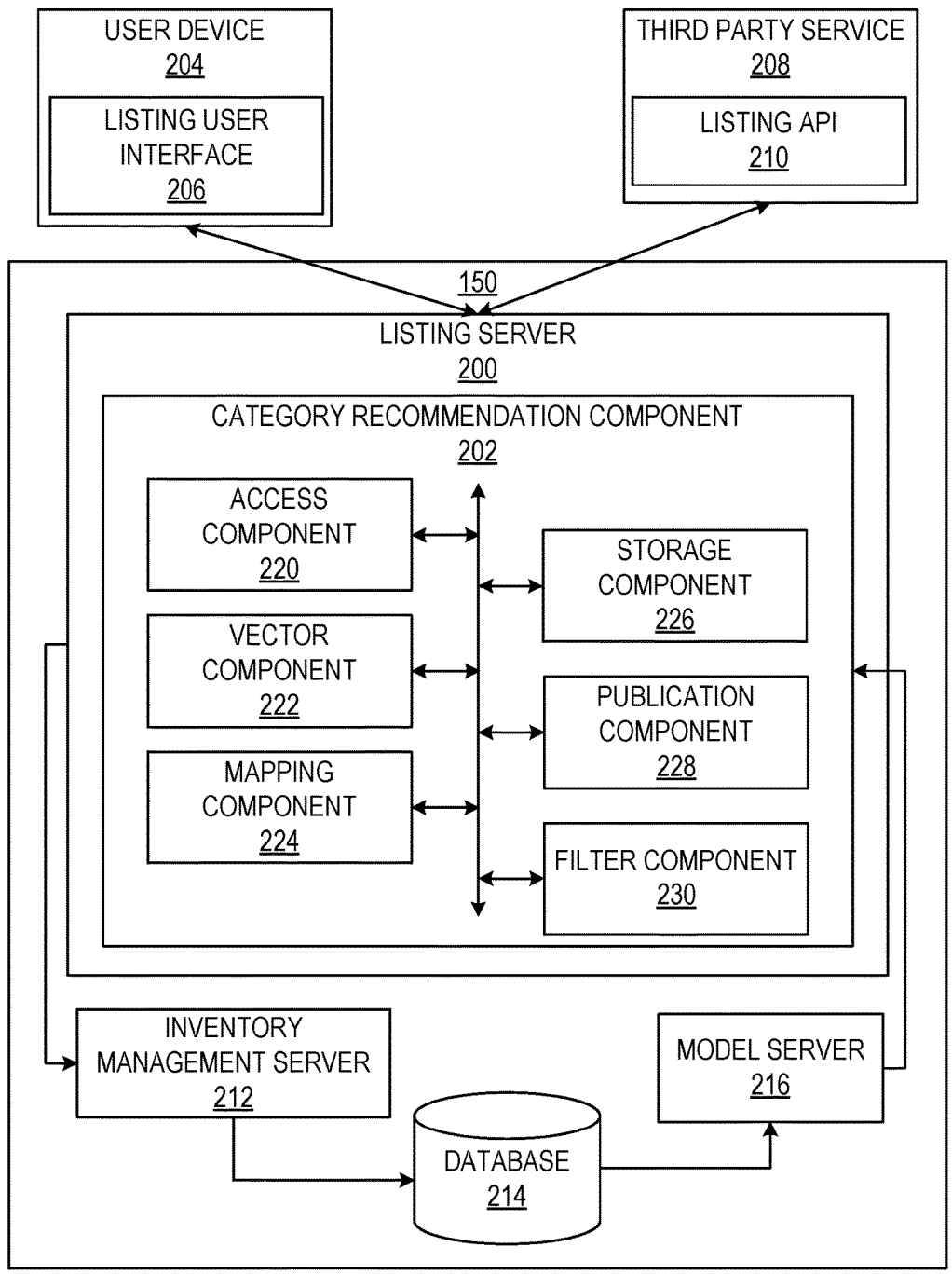
FIG. 2 is a block diagram illustrating the listing system of FIG. 1 in more detail, in accordance with an example embodiment.

FIG. 2 is a block diagram illustrating the listing system 150 of FIG. 1 in more detail, in accordance with an example embodiment. Here, the listing system 150 includes a listing server 200, which acts to perform back end processes related to the listing of items. The listing system 150 includes, among other components, a category recommendation component 202. User device 204 may be used directly by a user to list an item for sale by interacting with a listing user interface 206 to provide details of the item for listing. The listing user interface 206 communicates this information to the listing server 200. This process may be interactive in nature. For example, certain inputs by the user, via the listing user interface 206, are transmitted to the listing server 200, at which point the listing server 200 provides feedback, which can then cause the user to alter or add to the listing information provided. For purposes of this disclosure, the discussion will be limited to the category recommendation aspect of the listing server 200 as implemented by the category recommendation component 202. In one example embodiment, a user may enter a title or other text input via the listing user interface 206, which may then be passed to the category recommendation component 202. The category recommendation component 202 can then provide an ordered suggested list of categories for the item listing, which the user can then choose from via the listing user interface 206. In another example embodiment, a user (e.g., a B2C seller) may upload a list of items to be listed by the listing system 150. The list of items includes the item titles and categories (based on a seller's taxonomy) associated with each entry on the list. The category recommendation component 202 may then automatically map the category (based on the seller's taxonomy) to a category (based on the taxonomy of the publication system 142) for each entry. The seller may provide the seller's taxonomy in the inventory list (e.g., entries with item titles and category) provided by the seller, or the seller may provide a copy of the seller's taxonomy for upload into the publication system 142.

The listing user interface 206 may take many forms. In one example embodiment, the listing user interface 206 is a web page that is executed by a web browser on the user device 204. In another example embodiment, the listing user interface 206 is a mobile application installed on a mobile device.

The listing server 200 can also be accessed by a third party service 208 via a listing API 210. An example of a third party service 208 is a website that offers to aid sellers in the listing process by listing items on their behalf. The listing API 210 may be specifically designed to interact with the listing server 200 and distributed to multiple third party services 208.

Once a user has selected a category for the listing (due, at least in part, to the category recommendation component 202), or the listing system automatically maps the category from the seller's taxonomy to the taxonomy of the publication system 142, the listing server 200 sends the item listing to an inventory management server 212, which manages the process of publishing the listing by storing it in a listing database 214. This may be accomplished via a distributed architecture, such as Hadoop.

A model server 216 may then obtain information about listings from the listing database 214 to perform offline training to create and or modify the models (including leaf category models) that are used by the category recommendation component 202 when recommending the categories to the user. In some embodiments, the model server 216 may obtain information for performing offline training of the SSE models.

In various embodiments, sequence semantic embedding is used to encode a sequence of symbols (like a phrase, a sentence, or a paragraph) into a continuous, low-dimensional vector space where semantic level similar sequences will have closer representation in this vector space. This sequence semantic embedding approach can automatically capture the deep latent semantic meaning of a given product inventory taxonomy entry and project its semantic level meaning into a shared multi-dimensional vector space. In this way, any given inventory taxonomy entry coming from different systems can be computed and compared directly within the same shared semantic vector space. Additionally, the task of inventory taxonomy mapping across different systems involves the computing of and finding the closest sequence semantic vector representations between the source taxonomy entry and the target taxonomy entry. Moreover, in order to address a very large vocabulary in a real world product catalog data, can be modeled using the sequence at sub-word level using word hashing tech.

Figure 3:
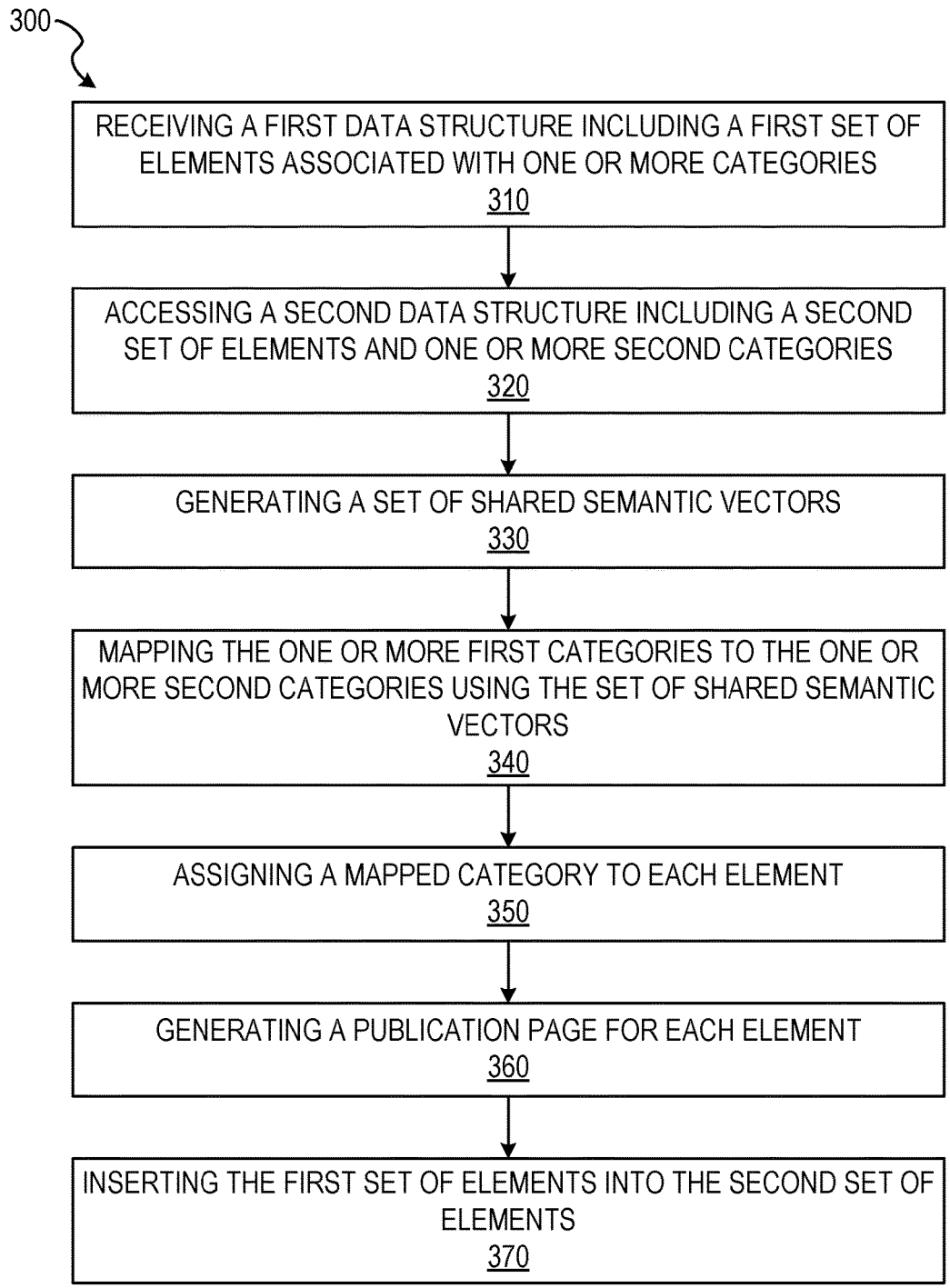
FIG. 3 is a flow diagram illustrating a runtime classification process to match a category from a first taxonomy to a second taxonomy, in accordance with an example embodiment.

FIG. 3 is a flow chart of operations of the listing system 150 in performing a method 300 of generating a runtime classification process to match a category from a first taxonomy to a second taxonomy according to an example embodiment. The first taxonomy and the second taxonomy may be located on different systems, databases, or networks and may be associated with discrete entities. Operations of the method 300 may be performed by the listing system 150, using components described above with respect to FIG. 2.

At operation 310, the access component 220 receives a first data structure. The first data structure may include a first set of elements associated with one or more first categories. The first data structure may be associated with a database or a database system. The access component 220 may receive the first data structure in response to a query, in response to initiation by the database or database system contacting the publication system 142, in response to an update operation, or any other suitable manner. The access component 220 may receive the first data structure by receiving one or more transmissions via a network (e.g., the Internet) from the database or database system. In some embodiments, the access component 220 receives the first data structure by accessing the database or database system using an API associated with the database system via a network connection.

In some instances, the first data structure includes a seller's inventory list. The first data structure may be received or accessed for uploading item listings, where the item listings are at least a portion of the first set of elements within the first data structure. Each entry (e.g., element of the first set of elements) on the seller's inventory list includes item titles along with the corresponding seller's category. In various embodiments, the seller represents a business-to-consumer (B2C) seller. The seller category (e.g., the one or more first categories) is based on a seller's taxonomy, which may be unique to a particular seller. In many cases, a seller's taxonomy is different from the taxonomy used by the publication system 142 for listing items. For example, different granularity and phrasing contributes to the inconsistences between taxonomies. By way of further example, misspellings, typographical errors, synonyms, and other variations in words, spelling, or phrasing contributes to inconsistencies between taxonomies.

In some embodiments, in response to receiving the first data structure, the mapping component 224 determines a first hierarchical association among the one or more first categories. The first hierarchical association may comprise a category tree path linking the one or more first categories within the first data structure.

In operation 320, the access component 220 accesses a second data structure associated with the publication system 142. The second data structure includes a second set of elements and one or more second categories. The access component 220 may access the second data structure in response to receiving the first data structure, an update request, a query, or any other suitable operation. The access component 220 may access the second data structure by a connection between the category recommendation component 202 and the listing database 214.

In some instances, the second data structure includes item listings stored on or accessible by the publication system 142. The item listings may include items listed for sale, trade, auction, or barter. The item listings may be transmitted or otherwise provided to the publication system 142 by a plurality of sellers, including a seller associated with the first data structure. The second data structure may also contain a set of titles associated with the item listings and other information (e.g., item descriptions) associated with the item listings. Each entry (e.g., element of the second set of elements) on the publication system 142 may be associated with a category of the one or more second categories. The one or more second categories may act as a listing taxonomy that may be unique to the publication system 142. As described above, the listing taxonomy used by the publication system 142 may differ from the taxonomy used by any one or more of the plurality of sellers, including the seller associated with the first data structure.

In operation 330, the vector component 222 generates a set of shared semantic vectors by comparing one or more terms of each category of the one or more first categories with one or more terms of each category of the one or more second categories. In some instances, as will be described in more detail below, the vector component 222 generates the set of shared semantic vectors by generating a representation of the terms of each category as a numerical value indicating one or more of a meaning, a context, a definition, or any other suitable description of the term.

In some embodiments, in generating the set of shared semantic vectors, the vector component 222 determines a semantic similarity measured by a similarity function. In some instances, the similarity function is a cosine similarity function. The cosine similarity may be a dot product modified by a normalization of the dot products of the vectors. For example, the semantic similarity measure may be represented as $X*Y/(\|X\|*\|Y\|)$, where X is the source vector and Y is the target vector. Each vector X and Y may be floating points with n dimensions. $X*Y$ may be the sum of the n dimensional floating points for the X vector and the Y vector. $\|X\|$ may be a normalization of the dot product of the X vector. $\|Y\|$ may be a normalization of the dot product of the Y vector. Although described in a specified embodiment with respect to cosine similarity functions, it should be understood that the semantic similarity may be determined by any suitable manner.

After generating a representation for each term of the one or more first categories and one or more second categories, the vector component 222 compares one or more terms for a specified first category of the one or more first categories to one or more terms for a specified second category of the one or more second categories using the cosine similarity function. The cosine similarity function may measure a similarity between two or more semantic vectors (e.g., vector representations of terms of each category). In some embodiments, the two or more semantic vectors may be non-zero vectors between which the cosine similarity function measures the cosine of the angle between the two or more vectors. In some embodiments, vectors are determined to be similar where the cosine of the angle between vectors is between zero and one in a positive space. In some instances, cosine similarity may be additionally determined when the cosine of the angle between vectors is above a predetermined threshold.

At operation 340, the mapping component 224 maps the one or more first categories to the one or more second categories using the set of shared semantic vectors. In some instances, the seller's category (e.g., the one or more first categories) for each entry (e.g., each element of the first set of elements) on the seller's inventory list is mapped to the category (e.g., a category of the one or more second categories) used by the publication system 142 for listing items for the seller. The taxonomy (e.g., the one or more second categories) used by the publication system 142 for categories may be represented by a category tree, and each leaf in the category tree may represent a category of the one or more second categories.

In various embodiments, the mapping is performed by learning the semantic similarity between a source sequence and a target sequence. In example embodiments, the semantic similarity, also referred to as semantic relevance, may be measured by a cosine similarity function sim (X, Y), where X represents the semantic vector of source sequence (i.e., derived from the seller's taxonomy) and Y represents the semantic vector of target sequence (i.e., derived from the category tree of the publication system). Both X and Y represent points in the shared semantic vector space. The output of the cosine similarity function represents how close those two points in the shared semantic vector space, i.e., how semantically similar between the source sequence and the target sequence. Generally, the best matched category of Y has the highest similarity score to X. The source sequence vector and target sequence vector have the same number of dimensions. For example, the source sequence represents an entry on the seller's inventory list (e.g., the seller's taxonomy entry and the item title) and the target sequence represents a category tree path (root-to-leaf) used by the publication system. In various embodiments, the target sequence is pre-computed before runtime and the source sequence is computed during runtime and then compared to the target sequence during runtime.

At operation 350, the storage component 226 assigns a mapped category of the set of second categories to each element of the first set of elements. The mapped categories are assigned to each entry on the list. Thus, each entry on the seller's inventory list is assigned a category used by the publication system 142. In some embodiments, two or more categories of the first categories may be mapped to a single category of the one or more second categories. In some instances, a single category of the one or more first categories may be mapped to a plurality of categories of the second categories. The storage component 226 may map the categories by inserting a reference to a first category into data or metadata representing a second category. In some instances, the mapping includes an indication of an entity (e.g., a seller or content generator) associated with the first category being mapped to the second category. The mapping may be stored in an entity data structure associated with the entity of the first data structure and the one or more first categories.

At operation 360, the publication component 228 generates a publication page for each element of the first set of elements. In some instances, the publication component 228 generates the publication pages in a database of the publication system 142 or a database associated with the publication system 142. For example, the publication component 228 may generate and store publication pages within the listing database 214. In some embodiments, the publication pages may be website pages. Where the elements are items on a seller's inventory list, the publication page may be a webpage within the publication system 142 configured to present information describing the element and enabling sale, auction, or other transfer of the element between the seller and a buyer over the publication system 142.

In operation 370, the storage component 226 inserts the first set of elements into the second set of elements based on the assigned mapped category of each element of the first set of elements. The storage component 226 may store the item listings (e.g., publication pages and element descriptions) from the seller's inventory list with the mapped categories. The mapped categories may indicate a second category of the publication system 142, a first category associated with the first data structure, an indication of an entity (e.g., the seller) associated with the first category, and any other suitable data for establishing the mapping and recall or retrieval of the mapping by the listing system 150 or the publication system 142.

Figure 4:
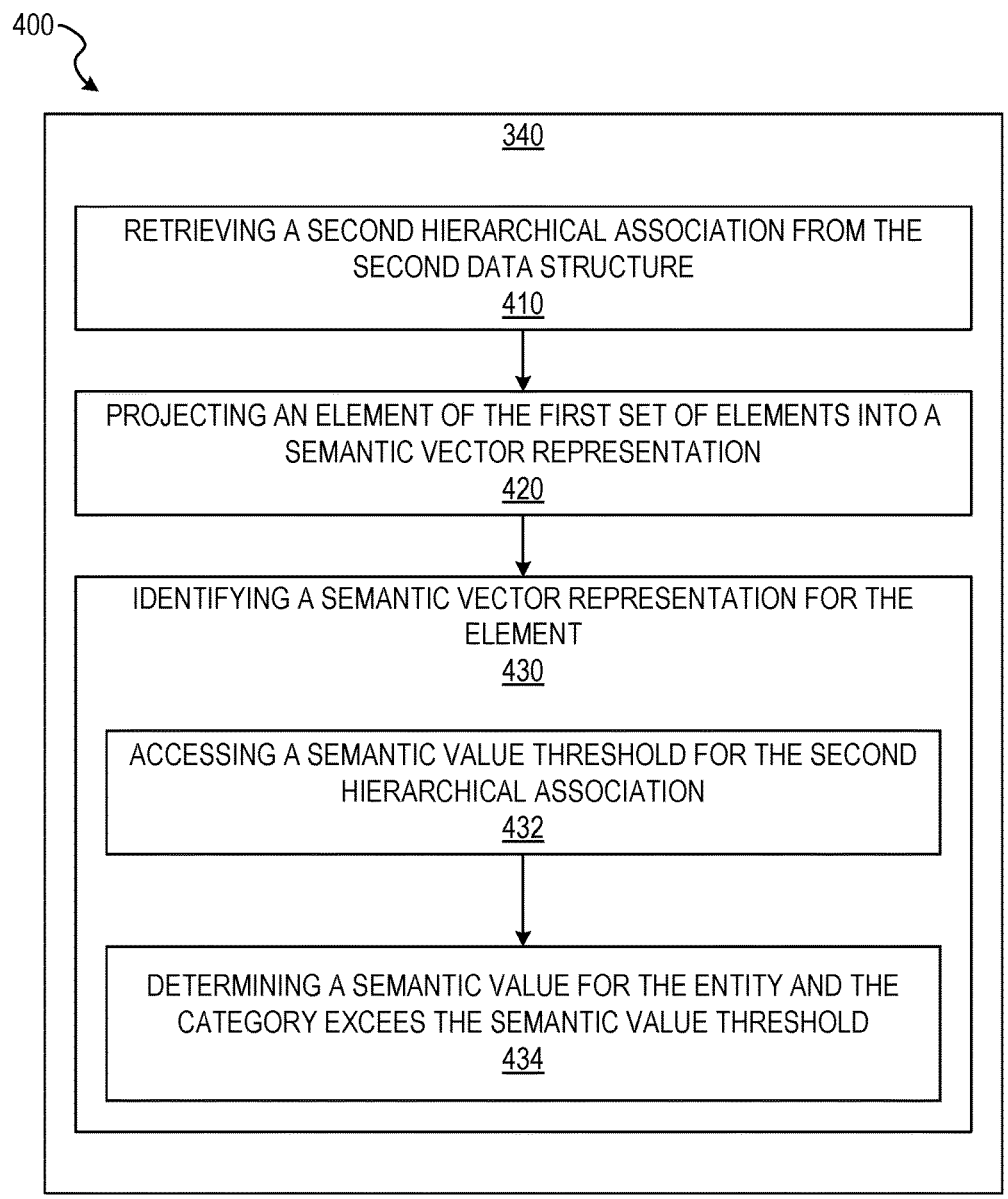
FIG. 4 illustrates a flow diagram of sub-operations included within operation 320, in accordance with an example embodiment.

FIG. 4 is a flow chart of operations of the listing system 150 in performing a method 400 of generating a runtime classification process to match a category from a first taxonomy to a second taxonomy according to an example embodiment. The first taxonomy and the second taxonomy may be located on different systems, databases, or networks and may be associated with discrete entities. Operations of the method 400 may be performed by the listing system 150, using components described above with respect to FIG. 2. In some embodiments, operations of the method 400 may form a part or sub-operations of operation 340 of the method 300. As such, the method 400 of sub-operations included within operation 340 in an example embodiment may enable or assist in mapping the seller's category's for each entry on the seller's inventory list to the category used by the publication system for listing items by using sequence semantic embedding.

The operation 340 shown in FIG. 4 includes the sub operations of 410, 420, and 430. At operation 410, the access component 220 retrieves a second hierarchical association from the second data structure. The second hierarchical association may include one or more semantic vector representations of the one or more second categories. The one or more semantic vector representations may be pre-computed semantic vector representations for the target system's (e.g., the publication system 142) inventory taxonomy entries, which are computed using the target SSE model, are retrieved.

In some embodiments, the second hierarchical association is generated by the vector component 222. The second hierarchical association may be generated among the one or more second categories within the second data structure associated with the publication system. The second hierarchical association may comprise a category tree path linking the one or more second categories within the data structure. In these embodiments, the semantic vector representations may be representations of a word, term, set of words, context based instances of a term or terms, or any other suitable elements, descriptions, titles, or categories of the second data structure. In some embodiments, the semantic vector representation may be a feature vector with a value (e.g., a real value, an integer value, an alphanumeric value, a hex value). In some instances, the feature vector value may be converted to a binary value.

At operation 420, the vector component 222 projects an element of the first set of elements into a semantic vector representation using a first hierarchical association determined for the one or more first categories. Operation 420 may be performed for each element of the first set of elements. In some embodiments, performing operation 420 enables each entry from the seller's inventory list to be projected into a semantic vector representation using the source SSE model.

At operation 430, the vector component 222 identifies a semantic vector representation among the one or more semantic vector representations for the element. In some instances, a target inventory taxonomy entry that has the closest semantic vector representation for particular seller inventory entry is identified.

Trained SSE modules are used to implement the runtime classifications. In various embodiments, the training of the SSE models is performed offline with training data. In some embodiments, labeled training data is automatically derived. For example embodiments, each labeled training sample is represented by a pair <source sequence, target sequence>. The source sequence is a sample product entry in a seller's inventory taxonomy; for example, a source sequence can be "food preparation utensils>chefs large food chopper." The target sequence is the target system's taxonomy entry name (i.e., publication system's category tree path for this seller's product), which could be "Home & Garden:Kitchen>Dining & Bar>Kitchen Tools & Gadgets>Choppers."

Generally, good natural language processing (NLP) and machine learning methods require labeled training data (i.e., supervised learning). Training the SSE modules with millions of labeled training data samples increases the accuracy of mapping results. In various embodiments, the SSE models are trained using already onboarded item listings in the publication system 142. The existing item listings already onboarded enable the SSE models to be quickly trained with relevant data. For example, a company such as eBay, Inc. located in San Jose Calif., has access to billions of already onboarded item listings with its seller's inventory taxonomy information recorded in a data warehouse. These already onboarded item listings can be processed to mine, join, and filter out millions of such labeled training data based on eBay's previous transaction data.

In some embodiments, operation 430 includes one or more sub-operations. As shown in FIG. 4, operation 430 includes operations 432 and 434. In operation 432, the access component 220 accesses a semantic value threshold for the second hierarchical association. The semantic value threshold may be a value (e.g., a cosine similarity value) indicating a level of relation between two semantic vectors. As described with respect to a cosine similarity value, the semantic value threshold may be an integer value bounded between an upper and lower bound. For example, the semantic value threshold may be an integer value between zero and one. In some instances, the semantic value threshold may be heuristically determined. The semantic value threshold may also be dynamically determined based on relative values identified between a category or element of the first data structure and a category of the second data structure.

In operation 434, the vector component 222 determines a semantic value for the entity and the category of the one or more first categories exceeds the semantic value threshold. When the semantic value for the entity and the category exceeds the semantic value threshold, the vector component 222 may identify the semantic vector representation. The semantic value may be directly compared to the semantic value threshold to determine the semantic value exceeds the semantic value threshold.

Figure 5:
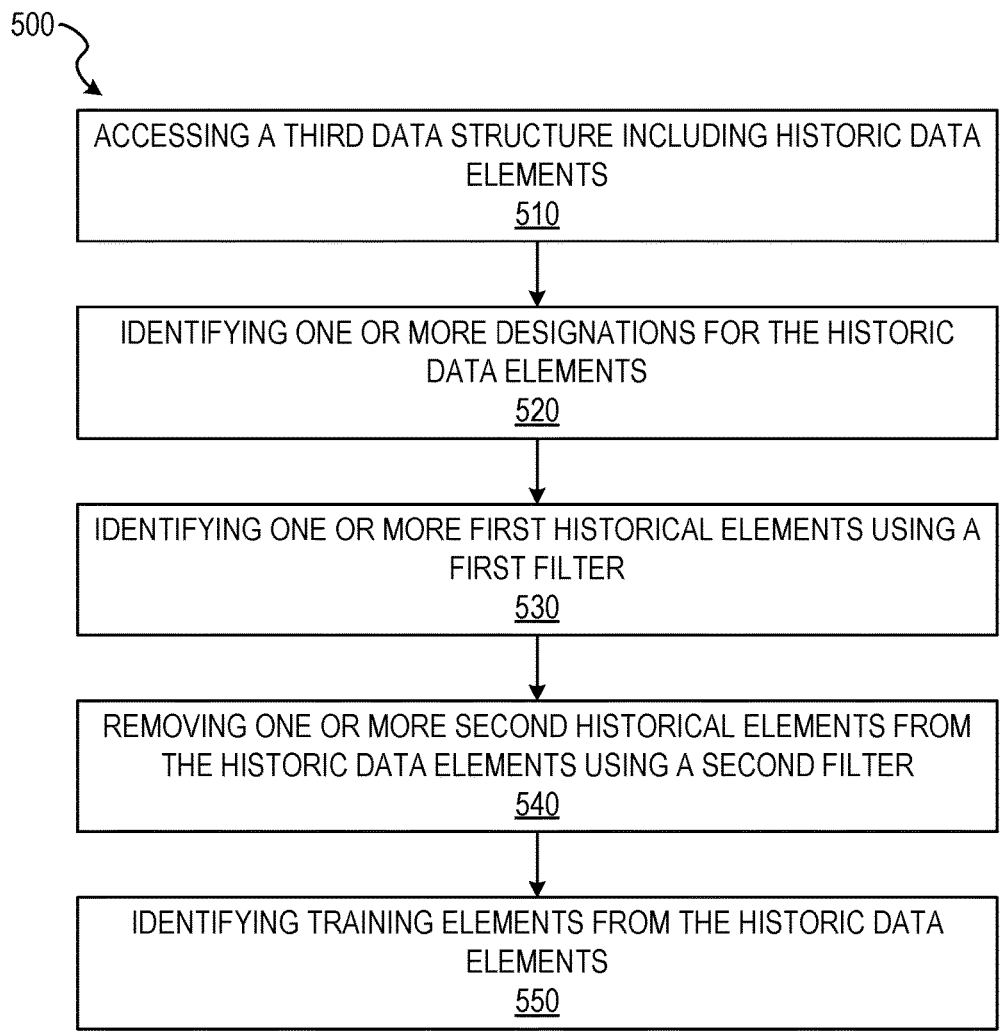
FIG. 5 illustrates a flow diagram of a method of deriving labeled training data, in accordance with an example embodiment.

FIG. 5 is a flow chart of operations of the listing system 150 in performing a method 500 of generating a runtime classification process to match a category from a first taxonomy to a second taxonomy, according to an example embodiment. Operations of the method 500 may be performed by the listing system 150, using components described above with respect to FIG. 2. In some embodiments, the method 500 may be performed along with one or more operations of the methods 300 or 400. In some instances, one or more operation of the method 500 may be performed as a precursor, a part of, or a sub-operation of one or more of the methods 300 or 400. In some embodiments, the method 500 may enable the listing system 150 to derive labeled training data, according to an example embodiment.

At operation 510, the access component 220 accesses a historic data structure. In some embodiments, the historic data structure is a third data structure including historic data elements for which publication pages have been generated within the database of the publication system 142. In some instances, the historical data is related to previous item listings onboarded (e.g., uploaded, inserted, or generated) by the seller. The historical data being retrieved from the publication system 142 may be stored in a data warehouse.

In operation 520, the mapping component 224 identifies one or more designations for the historic data elements within the third data structure. The one or more designations may join the one or more first categories and the one or more second categories. As such, in some embodiments, based on the historical data, the taxonomy from the seller and the taxonomy from the publication system 142 is joined by an item identification (ID). In some embodiments, training data that includes the item title, seller taxonomy, and publication system taxonomy are created based on the historic data elements.

In operation 530, the filter component 230 identifies one or more first historical elements from the historic data elements using a first filter to identify category matches with a primary category recommendation generated by the publication system 142. In some embodiments, the training data is filtered by the first filter (e.g., filter A). Filter A filters onboarded category matches with the top category recommendation generated by the publication system's recommendation system according to an example embodiment. Filter B filters lists the miscategorization scores that are less than 50. A miscategorization system within the publication system 142 generates this score according to an example embodiment. In an example embodiment, training data represents the top category recommended by the category recommendation system provided that the miscategorization score is less than 50.

In some embodiments, the miscategorization system may incorporate a publication (e.g., an item listing or a publication on a website), information from the publication (e.g., a title, a price, or other information), and current category information from the publication to generate the miscategorization scores. The current category information for the publication may include one or more category levels and leaf categories or category nodes. The category levels and category leaves or nodes may include a word or words for each category level which are interrelated to one another in a semantic relationship. The miscategorization system may use a statistical language model (SLM) and an unsupervised gradient boosting machine (GBM). The miscategorization system may use two components, the SLM and the GBM where the first component is unsupervised and enabled to derive a deep featured miscategorization evaluation based on a publication's computed title perplexity and an expected perplexity for a given leaf category. The SLM may qualify a likelihood of a given sequence of words for a specific category and compute the probability of the sequence of words. The GBM component may fuse traditional shallow features and the SLM-based deep features together to produce a final robust and accurate classifier.

In operation 540, the filter component 230 removes one or more second historical elements from the historic data elements using a second filter (e.g., filter B) to identify miscategorization scores. The miscategorization scores may be categorization scores exceeding a mismatch threshold. The miscategorization score may be derived using the SLM for a leaf category including the one or more historical elements.

In operation 550, the filter component 230 identifies training elements from the historic data elements. The training elements may include one or more first historical elements and may exclude the one or more second historic elements. In these embodiments, the filter component 230 identifies training elements which indicate a relatively high level of semantic relatedness between categories. These categories, having a high level of semantic relatedness may represent categories that are well matched using cosine similarity or any other suitable function.

Figure 6:
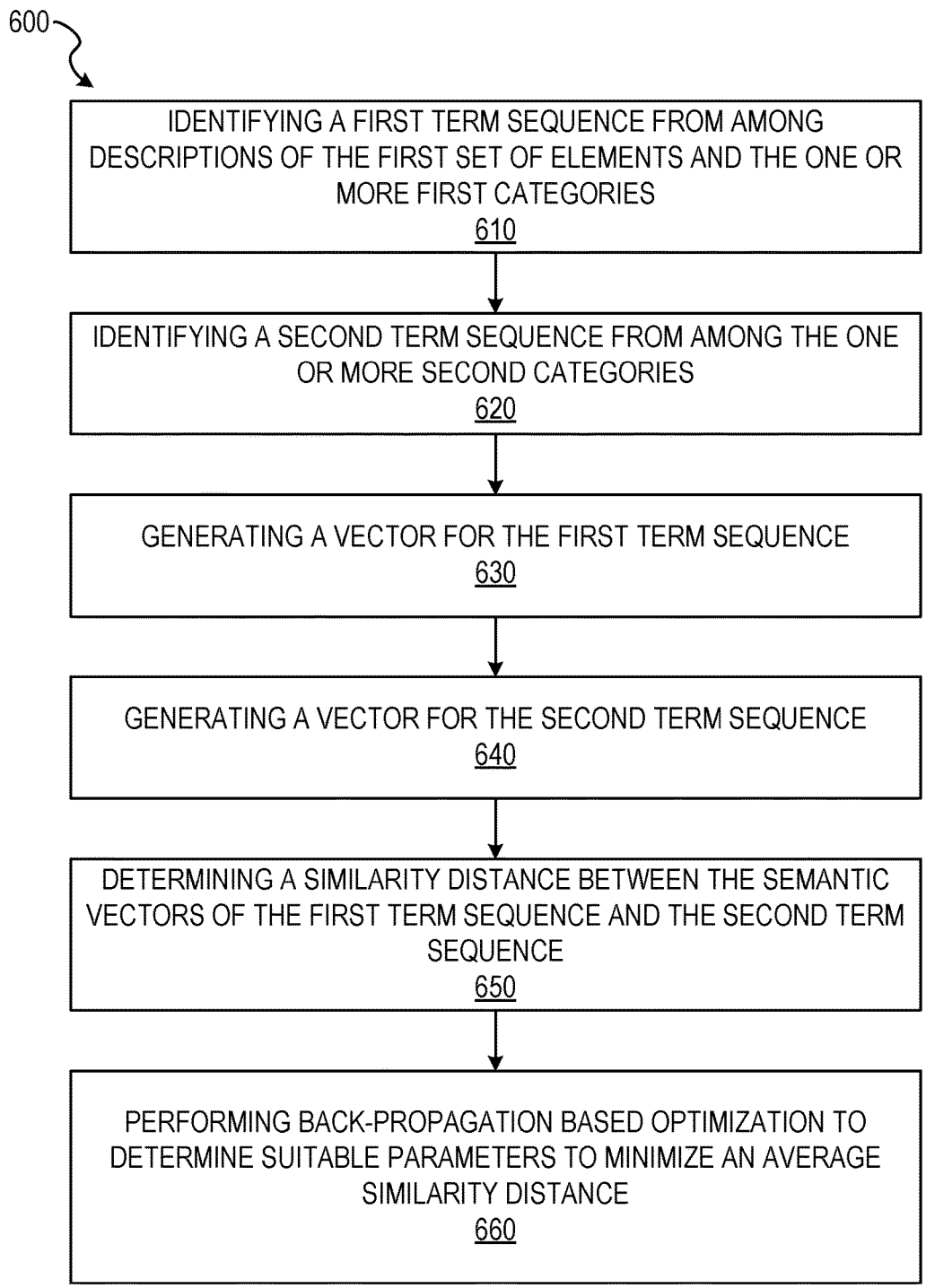
FIG. 6 illustrates a flow diagram of a method 600 for training an offline sequence semantic embedding (SSE) model, in accordance with an example embodiment.

FIG. 6 is a flow chart of operations of the listing system 150 in performing a method 600 of generating a runtime classification process to match a category from a first taxonomy to a second taxonomy according to an example embodiment. The first taxonomy and the second taxonomy may be located on different systems, databases, or networks and may be associated with discrete entities. Operations of the method 600 may be performed by the listing system 150, using components described above with respect to FIG. 2. In some embodiments, the method 600 enables the listing system 150 to train an offline SSE model according to an example embodiment. In these embodiments, the method 600 may be a precursor or be performed prior to operation 330 of the method 300.

In operation 610, the vector component 222 identifies a first term sequence from among descriptions of the first set of elements and the one or more first categories. The goal of the model training process is to try to obtain an optimized (e.g., theoretically optimized) source SSE model and an optimized target (e.g., theoretically optimized) SSE model such that for all training sample pairs, the distance between a continuous vector representation of the source sequence and a continuous vector representation of the target sequence is minimized. Equation 1 represents that minimum distance.

$$SrcMod^\sim, TgtMod^\sim = \operatorname*{argmin}_{k \text{ in all training pairs}} \sum \|SrcVec^k - TgtVec^k\| \quad \text{Equation 1}$$

In equation 1, ScrSeq is a source sequence, TgtSeq is a target sequence, SrcMod is a source SSE model, TgtMod is a target SSE model, SrcVec is a continuous vector representation for a source sequence, and TgtVec is a continuous vector representation for a target sequence. The source SSE model encodes the source sequence into a continuous vector representation. The target SSE model encodes the target sequence into a continuous vector representation. In an example embodiment, the vectors each have approximately 100 dimensions.

Raw sentence sequences are retrieved or generated in operation 610. The seller's taxonomy and title are used to create the raw sequence on the source side, and the category tree path from the publication system's taxonomy is used to create the raw sequence on the target side.

In operation 620, the a second term sequence is identified from among the one or more second categories based on training data pairs. In some instances, the second term sequence is a tree selected from the one or more second categories for a selected publication. The second term sequence may also be any suitable natural language string associated with a publication or set of publications. In some embodiments, operation 620 may be performed prior to initiation of operations 610 or 330. For example, in some instances, operation 620 is performed as an offline operation upon generation of the one or more second categories for the publication system 142. When new categories are added to the one or more second categories, the vector component 222 may perform operation 620 for one or more of the new categories to identify term sequences for the new categories.

In operation 630, the source neural network model (i.e., source SSE model) in vector component 222 generates a semantic vector for the whole first term sequence. In some embodiments, the vector component 222 generates the semantic vector for the first term sequence using a multilayer neural network. The multilayer neural network may be a first multilayer neural network formatted using one or more parameters suitable to the first term sequence and historical information relating to the entity associated with the first term sequence.

In some embodiments, the semantic vector for the first term sequence may be generating a vector for each term may have a predetermined character length (e.g., a predetermined length). The vector component 222 may generate the vector using word hashing for each term in the first and second term sequences. Word hashing is performed at operation 630 by transforming the terms into indices in a vector or matrix. In some instances, the vector component 222 applies a hash function to the terms to generate hash values. The hash values may be used as indices for the vector. In situations where there is a very large vocabulary word, hashing is performed on a sub-word unit. In various embodiments, letter 3-gram word hashing is performed. Although described as a 3-gram word hash, it should be understood that the predetermined character length may be any suitable length for the hash resulting from the word hashing function. Further, although described as generating a vector for each term using word hashing, it should be understood that the above described embodiments are a single possible neural network formulation and that other neural network formulations, operations, or setups may be used to generate the semantic vector.

In operation 640, the target neural network model (i.e., target SSE model) in vector component 222 generates a semantic vector for the whole second term sequence using one or more neural network layers. In an example embodiment, a convolution layer, a maximum pooling layer, and the semantic layer represent the one or more neural network layers. For example, the one or more neural network layers may generate 500 nodes configured in the one or more neural network layers. In another example, 100 nodes may be configured in the semantic layer in an example embodiment. In other embodiments, the number of nodes may be changed or configured to a different number, depending on the data size. In some instances, the vector component 222 may generate a semantic vector for the whole second term sequence similar to the manner of generating the semantic vector for the first term sequence. In some embodiments, the vector component 222 generates the semantic vector for the second term sequence using a multilayer neural network. The multilayer neural network may be a second multilayer neural network formatted using one or more parameters suitable to the second term sequence and historical information relating to the entity associated with the second term sequence.

In operation 650, the similarity distance between the semantic vector of first term sequence and the semantic vector between the second term sequence is computed. The similarity distance may be calculated using a similarity measure. For example, in some instances, the similarity measure used for determining the similarity distance is a cosine similarity function. The similarity distance may also be determined using XOR operations, determination of binary bit distances, or any other suitable manner.

In operation 660, the vector component 222 performs back-propagation based optimization methods can be used to find suitable (e.g., theoretically optimized) parameters for both source SSE model and the target SSE model so that the average similarity distance is minimized for all training data. In some embodiments, the operation 660 may minimize the average similarity distance using Equation 1, described above with respect to operation 610. The vector component 222 may use back-propagation methods such as stochastic gradient descent to minimize the average similarity distance, such as reducing the average similarity distance to below a predetermined distance threshold.

When both the source SSE model and the target SSE model are trained out, the semantic vector representations for all of the target system's inventory taxonomy entries can be pre-computed in advance using the SSE target model. Additionally, when there is a need to map any new incoming seller's inventory of items to list, each entry in the seller's inventory of items to list can be projected into a semantic vector representation using the SSE source model. The correct mapping for a particular seller inventory entry will be the target inventory taxonomy entry having the closest semantic vector representation.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-6 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the embodiments in different contexts from the disclosure contained herein.

Software Architecture

Figure 7:
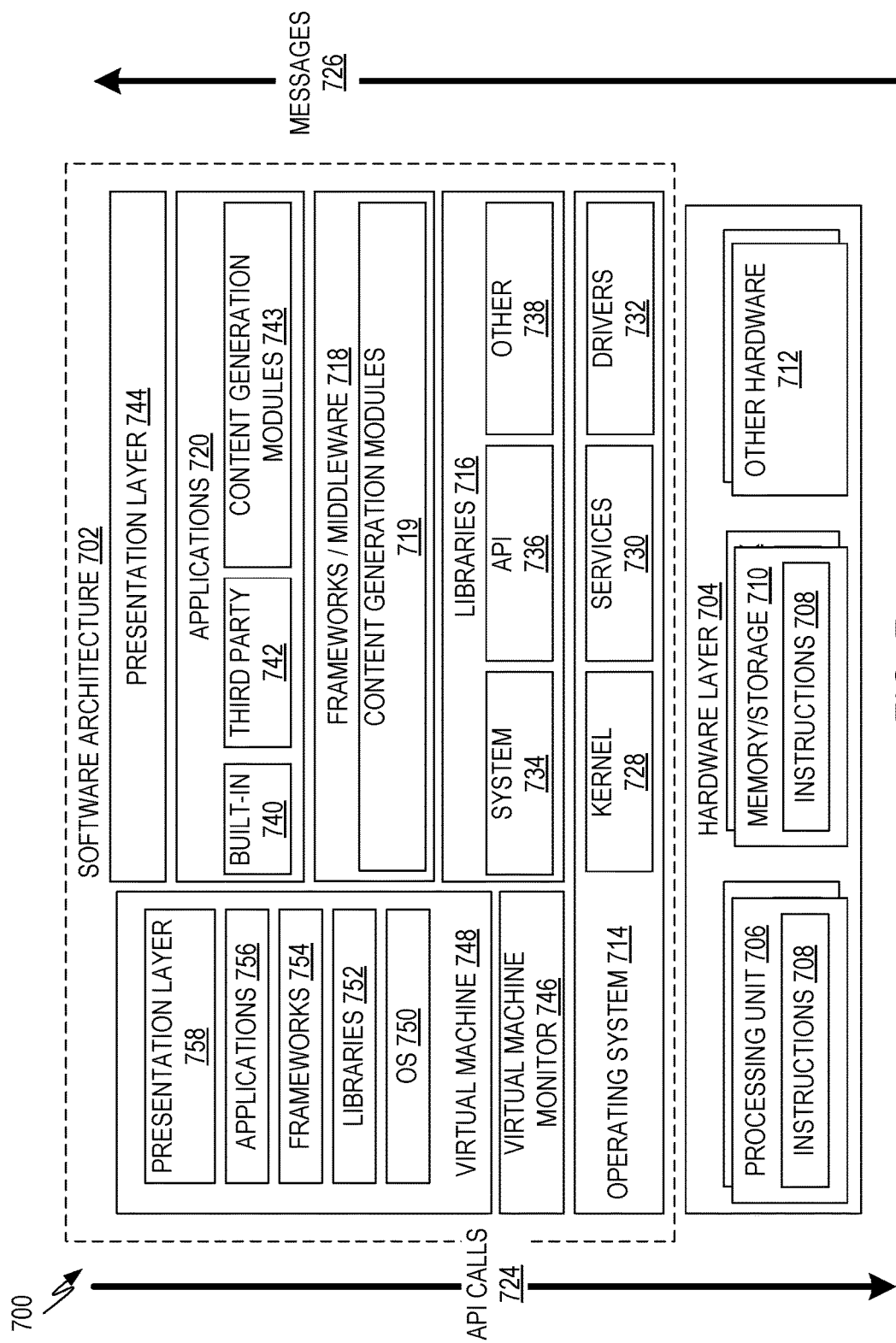
FIG. 7 is a block diagram illustrating an example of a software architecture that may be installed on a machine, according to some example embodiments.

FIG. 7 is a block diagram 700 illustrating a representative software architecture 702, which may be used in conjunction with various hardware architectures herein described. FIG. 7 is merely a non-limiting example of a software architecture and it will be appreciated that many other architectures may be implemented to facilitate the functionality described herein. The software architecture 702 may be executing on hardware such as machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 comprises one or more processing units 706 having associated executable instructions 708. Executable instructions 708 represent the executable instructions of the software architecture 702, including implementation of the methods, modules and so forth of FIGS. 1-6. Hardware layer 704 also includes memory or storage modules 710, which also have executable instructions 708. Hardware layer 704 may also comprise other hardware as indicated by 712, which represents any other hardware of the hardware layer 704, such as the other hardware illustrated as part of machine 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720 and presentation layer 744. Operationally, the applications 720 or other components within the layers may invoke API calls 724 through the software stack and receive a response, returned values, and so forth (illustrated as messages 726) in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730, or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional (2D) and three-dimensional (3D) in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 719 (also sometimes referred to as middleware) may provide a higher-level common infrastructure that may be utilized by the applications 720 or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third party applications 742. Examples of representative built-in applications 740 may include, but are not limited to, a contacts application, a browser application, a book reader application, a location application, a media application, a messaging application, and/or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 742 may invoke the API calls 724 provided by the mobile operating system such as operating system 714 to facilitate functionality described herein.

The applications 720 may utilize built in operating system functions (e.g., kernel 728, services 730 and/or drivers 732), libraries (e.g., system 734, APIs 736, and other libraries 738), and/or frameworks/middleware 718 to create user interfaces to interact with users of the system. Alternatively, or additionally, in some systems, interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware machine (such as the machine of FIG. 8, for example). A virtual machine is hosted by a host operating system (operating system 714 in FIG. 8) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756, and/or presentation layer 758. These layers of software architecture executing within the virtual machine 748 can be the same as corresponding layers previously described or may be different.

Example Machine Architecture and Machine-Readable Medium

Figure 8:
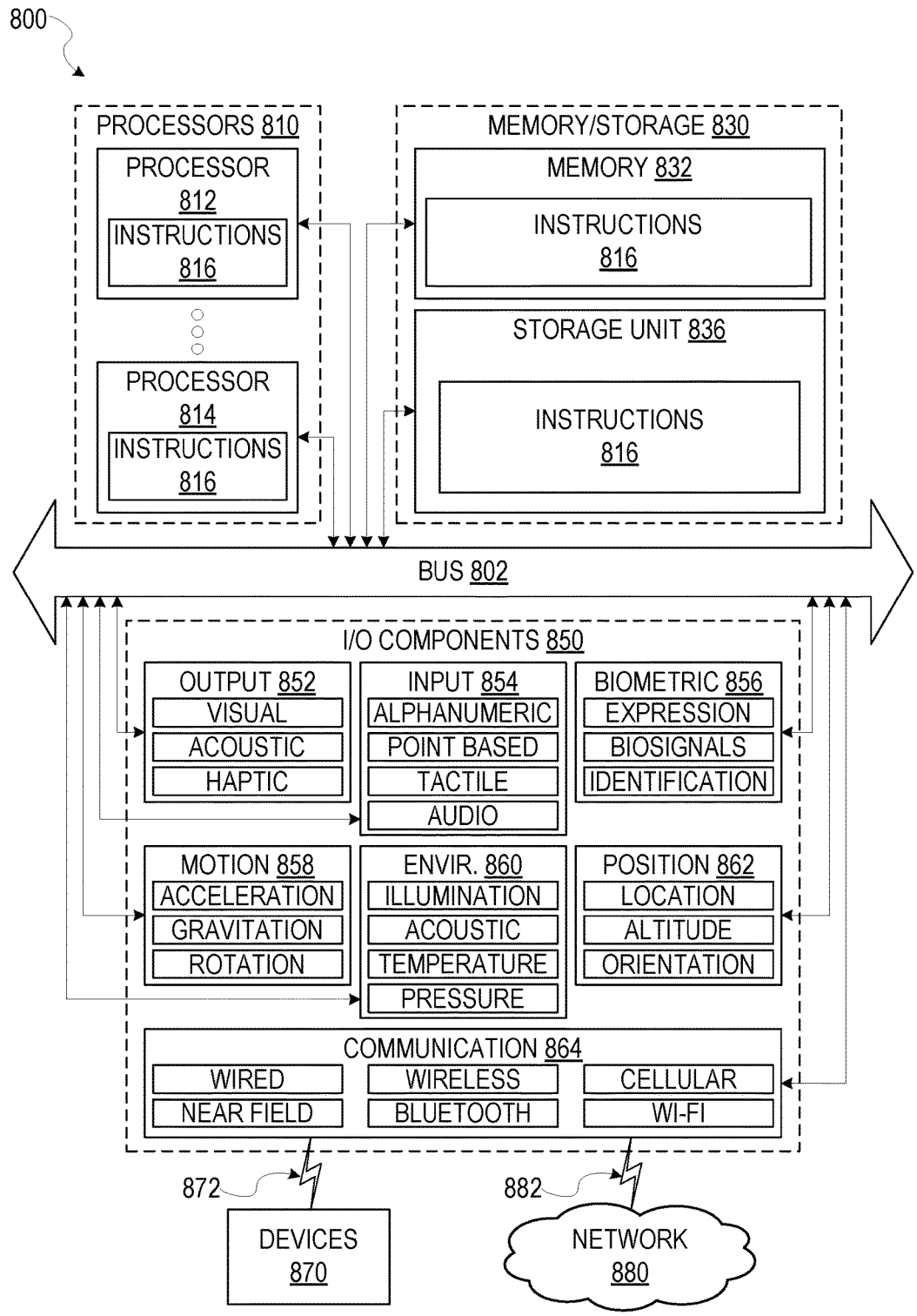
FIG. 8 illustrates a diagrammatic representation of a machine in the form of a computer system within which a set of instructions may be executed for causing the machine to perform any one or more of the methodologies discussed herein, according to an example embodiment.

FIG. 8 is a block diagram illustrating components of a machine 800, according to some example embodiments, able to read instructions (e.g., processor executable instructions or machine executable instructions) from a machine-readable medium (e.g., a machine-readable storage medium or machine-readable storage device) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example the instructions may cause the machine to execute the flow diagram of FIG. 7. Additionally, or alternatively, the instructions may implement FIGS. 1-6, and so forth. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 812 and processor 814 that may execute instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a global positioning system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872, respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software. Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   receiving, by one or more processors of a publication system, a first data structure including a first set of elements associated with one or more first categories of a first category taxonomy, the first data structure associated with a database system;
   accessing a second data structure associated with the publication system, the second data structure including a second set of elements and one or more second categories of a second category taxonomy, wherein the second category taxonomy is different than the first category taxonomy;
   generating a set of shared semantic vectors by comparing one or more terms of each category of the one or more first categories with one or more terms of each category of the one or more second categories;
   mapping at least a portion of the first category taxonomy to the second category taxonomy based on a comparison of a first portion of the set of shared semantic vectors that is associated with the one or more first categories of the first category taxonomy to a second portion of the set of shared semantic vectors that is associated with the one or more second categories of the second category taxonomy;
   assigning a mapped category of the set of second categories to each element of the first set of elements based on the mapping of the portion of the first category taxonomy to the second category taxonomy;
   generating a publication page, within a database of the publication system, for each element of the first set of elements; and
   inserting the first set of elements into the second set of elements based on the assigned mapped category of each element of the first set of elements.

2. The method of claim 1, wherein generating the set of shared semantic vectors further comprises:
   determining a semantic similarity measured by a similarity function comparing one or more terms for a specified first category of the one or more first categories to one or more terms for a specified second category of the one or more second categories.

3. The method of claim 1, wherein, in response to receiving the first data structure, determining a first hierarchical association among the one or more first categories, the first hierarchical association comprising a category tree path linking the one or more first categories within the first data structure.

4. The method of claim 1, further comprising:
generating a second hierarchical association among the one or more second categories within the second data structure associated with the publication system, the second hierarchical association comprising a category tree path linking the one or more second categories within the data structure.

5. The method of claim 4 further comprising:
retrieving the second hierarchical association from the second data structure, the second hierarchical association including one or more semantic vector representations of the one or more second categories;
for each element of the first set of elements, projecting an element of the first set of elements into a semantic vector representation using a first hierarchical association determined for the one or more first categories; and
identifying a semantic vector representation among the one or more semantic vector representations for the element.

6. The method of claim 5, wherein identifying the semantic vector representation for the element further comprises:
accessing a semantic value threshold for the second hierarchical association; and
determining a semantic value for the element and a category of the one or more first categories exceeds the semantic value threshold.

7. The method of claim 1, further comprising:
accessing a third data structure including historic data elements for which publication pages have been generated within the database of the publication system;
identifying one or more designations for the historic data elements within the third data structure, the one or more designations joining the one or more first categories and the one or more second categories;
identifying one or more first historical elements from the historic data elements using a first filter to identify category matches with a primary category recommendation generated by the publication system;
removing one or more second historical elements from the historic data elements by a second filter to identify miscategorization scores, the miscategorization scores being categorization scores exceeding a mismatch threshold; and
identifying training elements from the historic data elements, the training elements including the one or more first historical elements and excluding the one or more second historical elements.

8. The method of claim 1, wherein generating the set of shared semantic vectors further comprises:
identifying a first term sequence from among descriptions of the first set of elements and the one or more first categories;
identifying a second term sequence from among the one or more second categories;
generating a vector for the first term sequence and the second term sequence, the vector having a predetermined length;
determining a similarity distance between the vector for the first term sequence and the vector for the second term sequence; and
performing back-propagation based optimization to determine suitable parameters to minimize an average similarity distance.

9. A system, comprising:
one or more processors; and
a machine-readable storage device coupled to the one or more processors, the machine-readable storage device comprising processor executable instructions that, when executed by the one or more processor, cause the one or more processors to perform operations comprising:
receiving, by one or more processor of a publication system, a first data structure including a first set of elements associated with one or more first categories of a first category taxonomy, the first data structure associated with a database system;
accessing a second data structure associated with the publication system, the second data structure including a second set of elements and one or more second categories of a second category taxonomy, wherein the second category taxonomy is different than the first category taxonomy;
generating a set of shared semantic vectors by comparing one or more terms of each category of the one or more first categories with one or more terms of each category of the one or more second categories;
mapping at least a portion of the first category taxonomy to the second category taxonomy based on a comparison of a first portion of the set of shared semantic vectors that is associated with the one or more first categories of the first category taxonomy to a second portion of the set of shared semantic vectors that is associated with the one or more second categories of the second category taxonomy;
assigning a mapped category of the set of second categories to each element of the first set of elements based on the mapping of the portion of the first category taxonomy to the second category taxonomy;
generating a publication page, within a database of the publication system, for each element of the first set of elements; and
inserting the first set of elements into the second set of elements based on the assigned mapped category of each element of the first set of elements.

10. The system of claim 9, wherein generating the set of shared semantic vectors further comprises:
determining a semantic similarity measured by a similarity function comparing one or more terms for a specified first category of the one or more first categories to one or more terms for a specified second category of the one or more second categories.

11. The system of claim 9, wherein, in response to receiving the first data structure, determining a first hierarchical association among the one or more first categories, the first hierarchical association comprising a category tree path linking the one or more first categories within the first data structure.

12. The system of claim 9, wherein the operations further comprise:
generating a second hierarchical association among the one or more second categories within the second data structure associated with the publication system, the second hierarchical association comprising a category tree path linking the one or more second categories within the data structure.

13. The system of claim 12, wherein the operations further comprise:
retrieving the second hierarchical association from the second data structure, the second hierarchical association including one or more semantic vector representations of the one or more second categories;
for each element of the first set of elements, projecting an element of the first set of elements into a semantic vector representation using a first hierarchical association determined for the one or more first categories; and identifying a semantic vector representation among the one or more semantic vector representations for the element.

14. The system of claim 13, wherein identifying the semantic vector representation for the element further comprises:

accessing a semantic value threshold for the second hierarchical association; and determining a semantic value for the element and a category of the one or more first categories exceeds the semantic value threshold.

15. A machine-readable storage device comprising processor executable instructions that, when executed by a processor of a machine, cause the machine to perform operations comprising:

receiving, by one or more processors of a publication system, a first data structure including a first set of elements associated with one or more first categories of a first category taxonomy, the first data structure associated with a database system;

accessing a second data structure associated with the publication system, the second data structure including a second set of elements and one or more second categories of a second category taxonomy, wherein the second category taxonomy is different than the first category taxonomy;

generating a set of shared semantic vectors by comparing one or more terms of each category of the one or more first categories with one or more terms of each category of the one or more second categories;

mapping at least a portion of the first category taxonomy to the second category taxonomy based on a comparison of a first portion of the set of shared semantic vectors that is associated with the one or more first categories of the first category taxonomy to a second portion of the set of shared semantic vectors that is associated with the one or more second categories of the second category taxonomy;

assigning a mapped category of the set of second categories to each element of the first set of elements based on the mapping of the portion of the first category taxonomy to the second category taxonomy;

generating a publication page, within a database of the publication system, for each element of the first set of elements; and inserting the first set of elements into the second set of elements based on the assigned mapped category of each element of the first set of elements.

16. The machine-readable storage device of claim 15, wherein generating the set of shared semantic vectors further comprises:

determining a semantic similarity measured by a similarity function comparing one or more terms for a specified first category of the one or more first categories to one or more terms for a specified second category of the one or more second categories.

17. The machine-readable storage device of claim 15, wherein, in response to receiving the first data structure, determining a first hierarchical association among the one or more first categories, the first hierarchical association comprising a category tree path linking the one or more first categories within the first data structure.

18. The machine-readable storage device of claim 15, wherein the operations further comprise:

generating a second hierarchical association among the one or more second categories within the second data structure associated with the publication system, the second hierarchical association comprising a category tree path linking the one or more second categories within the data structure.

19. The machine-readable storage device of claim 18, wherein the operations further comprise:

retrieving the second hierarchical association from the second data structure, the second hierarchical association including one or more semantic vector representations of the one or more second categories;

for each element of the first set of elements, projecting an element of the first set of elements into a semantic vector representation using a first hierarchical association determined for the one or more first categories; and identifying a semantic vector representation among the one or more semantic vector representations for the element.

20. The machine-readable storage device of claim 19, wherein identifying the semantic vector representation for the element further comprises:

accessing a semantic value threshold for the second hierarchical association; and determining a semantic value for the element and a category of the one or more first categories exceeds the semantic value threshold.

\* \* \* \* \*